United States Patent [19]

Hoff

[11] 4,202,771
[45] May 13, 1980

[54] CHEMICAL RECOVERY FILTER

[76] Inventor: Robert W. Hoff, R.R. 2, Box 66, Hudson, S. Dak. 57034

[21] Appl. No.: 974,341

[22] Filed: Dec. 29, 1978

[51] Int. Cl.² .............................................. B01D 27/10
[52] U.S. Cl. .................... 210/130; 210/232; 210/440; 210/457; 210/473
[58] Field of Search ............ 210/232, 440, 442, 457, 210/96 M, 168, 167, 130, 473; 285/316, 277

[56] References Cited

U.S. PATENT DOCUMENTS

| | | | |
|---|---|---|---|
| 2,031,935 | 2/1936 | Caho | 210/440 X |
| 2,569,186 | 9/1951 | Ogilue | 210/442 |
| 2,712,931 | 7/1955 | Maddock | 210/440 UX |
| 2,928,499 | 3/1960 | Nallinger | 210/168 X |
| 3,237,770 | 3/1966 | Humbert, Jr. | 210/442 |
| 3,352,779 | 11/1967 | Austin et al. | 210/96 M |
| 3,909,414 | 9/1975 | Drath | 210/232 |
| 4,014,467 | 3/1977 | Ferguson | 285/316 |
| 4,026,581 | 5/1977 | Pasbrig | 285/316 |
| 4,039,209 | 8/1977 | Goodlaxson | 285/316 |

Primary Examiner—Theodore A. Granger
Attorney, Agent, or Firm—Henderson & Sturm

[57] ABSTRACT

A chemical recovery filter including a new and improved structure which allows rapid and efficient replacement of filter canisters. The structure incorporates snap-connector fittings and a by-pass safety feature in the event of plugging within the system.

2 Claims, 5 Drawing Figures

CHEMICAL RECOVERY FILTER

BACKGROUND OF THE INVENTION

The present invention relates generally to a chemical recovery filter and more particularly to a recovery filter for silver recovery from waste photographic fixing solution.

One of the problems with presently known filters is the problem of leakage and other maintenance and service problems associated with the threaded or friction fittings used at the inlet and outlet ports of the filter. Another problem associated with presently known filters is the potential for damaging the film processor when a plug develops in the final drain or within the canister causing the spent solution to back up in the system.

SUMMARY OF THE INVENTION

The instant invention pertains to a chemical recovery filter including a metallic replacement cartridge for silver recovery from waste photographic fixing solution, a steel wire filter element and PVC plastic quick-disconnect fittings.

The snap-connect fittings are a new and improved method of attachment for chemical recovery filters to photographic fixer and bleach fixer automatic film processing overflow tubing. Unlike presently used threaded or friction fittings, the snap-connect fittings have a positive-o-ring seal that maintains the fluid-tight seal and prevents leakage even though the fitting itself is swiveled, turned or repositioned. The snap-connect fitting insures a fast and dependable connection to the canister thus minimizing valuable installation and service time. Another feature of the snap-connector is that it cannot be over-tightened, under-tightened, or cross-threaded.

The highly corrosive nature of photographic fixer solution necessitates fittings of resistant materials. The main components of the snap-fitting are of molded PVC plastic resin; the compression spring and flat washer in the female housing is 316 stainless steel, and the o-rings are constructed of neoprene.

An object of the present invention is the provision of an improved chemical recovery filter for use in conjunction with automatic film processing equipment.

Another object is to provide a chemical recovery filter which can be easily and efficiently replaced.

A further object of the invention is the provision of an improved means of connecting and disconnecting of the filter unit to the waste system.

Still another object is to provide a safe filter unit which will minimize the risk of damage or contamination to automatic film processing equipment.

Other objects, advantages, and novel features of the present invention will become apparent from the following detailed description of the invention when considered in conjunction with the accompanying drawings.

DESCRIPTION OF THE PREFERRED EMBODIMENTS

Figures 1, 2, 3, 4, 5:
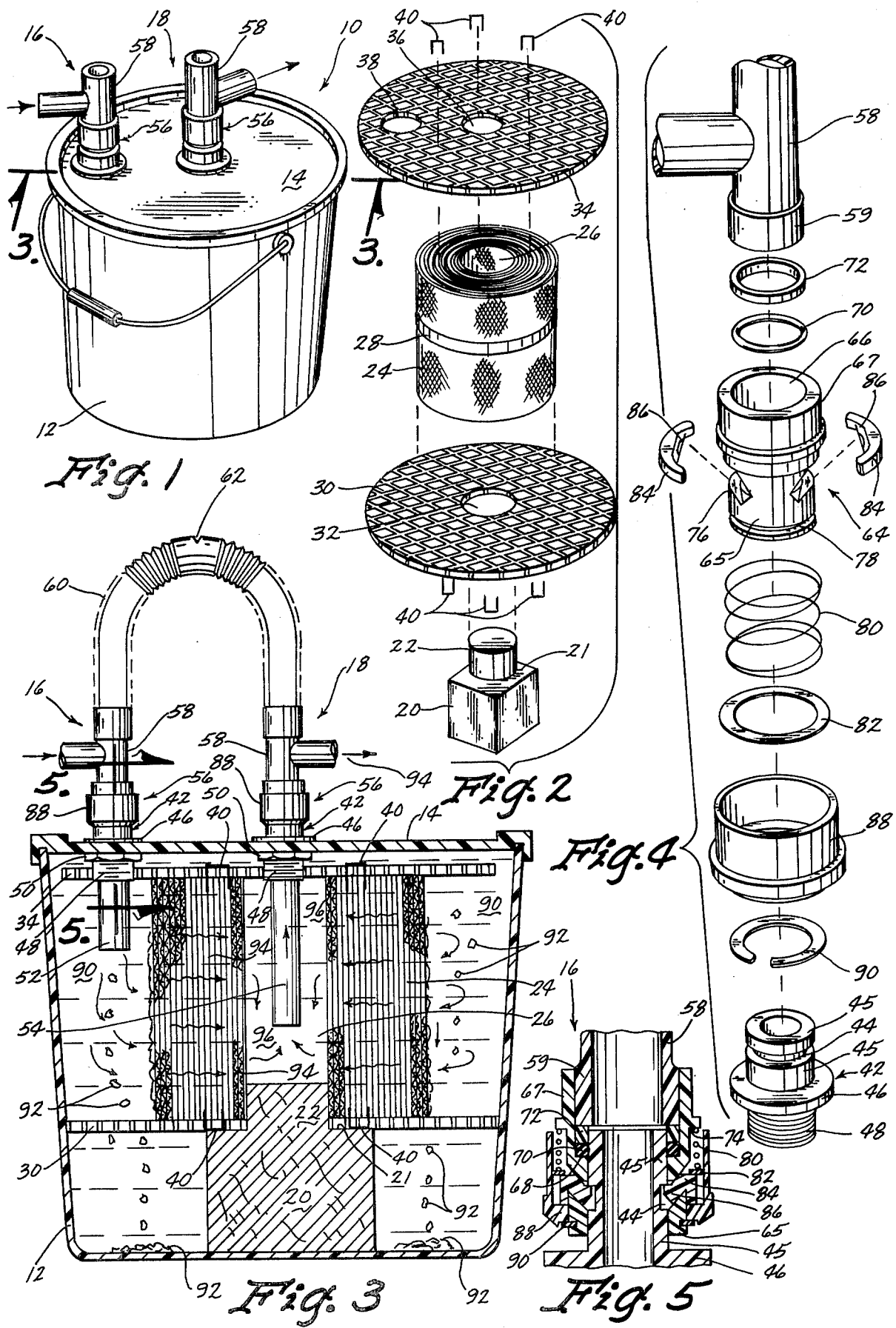
FIG. 1 is a perspective view of the chemical recovery filter of this invention.
FIG. 2 is an exploded perspective view showing the internal core and spacers of the filter.
FIG. 3 is a sectional view showing the flow of solution through the filter.
FIG. 4 is a greatly enlarged exploded perspective view showing the inlet and outlet port fitting.
FIG. 5 is an enlarged sectional view taken along line 5—5 of FIG. 3.

Referring now to the drawings, wherein like reference numerials designate identical or corresponding parts throughout the several views, FIG. 1 shows the filter 10 which includes a canister 12 and a cover 14. The cover 14 is adapted to receive an inlet fitting 16 and an outlet fitting 18 which are described more fully below.

As shown most clearly in FIGS. 2 and 3, disposed interior of the canister 12 is a vertical spacer 20 having an upper contact surface 21 and including an integrally formed circular plug 22. A wire roll filter element 24 is formed by wrapping wire mesh to form a cylinder having a core 26 and the outer wrap is held by strap 28. The plug 22 extends upwardly in mating relationship with the core 26. A bottom plastic open grid horizontal spacer 30 having a central opening 32; and a top plastic open grid horizontal spacer 34 having a central opening 36 and an off-center opening 38 are secured to the bottom and top, respectively, of the wire roll 24 by wire staples 40.

As shown in FIG. 3, the circular plug 22 is received through central opening 32 and extends into the lower portion of core 26 to prevent flow through the lower portion of core 26, while the contact surface 21 of vertical spacer 20 supports and holds the wire roll 24 in its vertical position within canister 12. Likewise, the bottom horizontal spacer 30 and the top horizontal spacer 34 hold the wire roll 24 in its horizontal position within canister 12.

As shown in FIG. 4, the inlet fitting 16 and the outlet fitting 18, include a male snap-connector stem 42 having an anular groove 44 formed in tube 45, a base collar 46, and a threaded lower stem 48. The threaded lower stem 48 extends through openings (not shown) in cover 14 and jam nuts 50 hold the male stems 42 in position. Referring now to FIG. 3, tube 52 extends downwardly from inlet fitting 16 through off-center opening 38 of top spacer 34, and tube 54 extends downwardly from outlet fitting 18 through central opening 36 into core 26.

As shown in FIG. 3, female snap-connectors 56 are adapted to connect with male snap-connector stems 42; and plastic tees 58 extend upwardly from female connectors 56. A flexible by-pass tube 60, having a siphon break vent 62, connects between the tees 58 of the inlet fitting 16 and the outlet fitting 18.

Referring now to FIGS. 4 and 5, the female snap-connector 56 includes a main body portion 64 having a lower cylindrical bore (not shown) within the lower portion 65 and an upper cylindrical bore 66 of a slightly larger diameter within the enlarged upper portion 67. The difference in bore diameters results in the formation of internal seating surface 68 which accomodates neoprene o-ring 70 which is held in place by retaining ring 72, as shown in FIG. 5. Also, the enlarged lower portion 59 of tee 58 is received in bore 66 and abuts ring 72. Tee 58 is secured to the enlarged upper portion 67 by adhesive or other suitable means.

Upper portion 67 has a greater outside diameter than lower portion 65 thereby forming external seating surface 74. The lower portion 65 also has two counter-opposing downwardly inclined slots 76 cut through the sidewall and an annular groove 78 formed in the sidewall below slots 76. Compression spring 80 fits over lower portion 65 and contacts external seating surface 74; and spring 80 is held in position by washer 82 and arcuate spring retainer tabs 84.

The tabs 84 include a projection 86 inclined downwardly and adapted for mating relationship with inclined slots 76. The tabs 84 are moveable between a first lower position wherein the projections 86 extend to the interior of the lower cylindrical bore to contact annular groove 44 and a second raised position wherein the projections 86 are not extending into the lower cylindrical bore, thereby permitting removal of the female connector 56. The compression spring 80 biases the tabs 84 toward the first lower position as shown in FIG. 5. The spring 80, washer 82, and tabs 84 are enclosed in a spring connector cover 88 which is held in position by snap ring 90 which engages annular groove 78.

As most clearly shown in FIG. 5, when the male connector 42 and the female connector 56 are connected by engagement of projections 86 with groove 44, the upper portion of tube 45 extends beyond o-ring 70. Thus, the o-ring 70 forms a seal between the outside wall of tube 45 and the inside wall of the main female body portion 65. Also, since since groove 44 extends around the outer circumference of tube 45, the projections 86 will engage the groove 44 and the o-ring 70 will perform its sealing function while the female connector 56 is freely rotatable to any position.

In operation, the horizontal member of tee 58 at the inlet fitting 16 is connected to an automatic film processor by plastic tubing (not shown). The spent fixer solution 90 is gravity-fed into the filter 10. The solution 90 enters the canister 12 through tube 52 and passes through filter element 24. The silver ions in the fixer solution are attached to and built up onto the outside of the wire filter element 24 where, after repeated build-up the silver sludge 92 falls to the bottom of canister 12 through the open grid of bottom spacer 30.

As shown by flow lines 94 in FIG. 3, the silver free solution 96 passes through the filter element 24 into core 26 and is forced out of canister 12 through tube 54. The silver free solution 96 then continues its gravity-forced path to an approved waste drain (not shown).

The flexible plastic by-pass tube 60 which interconnects the inlet fitting 16 and outlet fitting 18 provides an extra measure of security which protects the film processor from accidental damage or contamination. If a plug develops in the final drain or inside the canister 12, the spent solution 90 will either safely by-pass the canister 12 and discharge to the drain, or spill over at the siphon-break vent hole 62 at the uppermost portion of by-pass tube 60.

When the steel wire filter element 24 reaches exhaustion, caused by ionic metallic replacement of silver ions for ferric(ous) ions, a new canister 12 is then installed. This replacement procedure is greatly simplified by the snap-connect fittings. The operator simply applies upward pressure on the spring connector cover 88, which pressure against spring 80 moves tabs 84 from the first lower position wherein projections 86 are in mating relationship with groove 44 to a second raised position wherein projections 86 are retracted, thus allowing a quick and efficient means of uncoupling fittings 16 and 18.

Thus it can be seen that a novel chemical recovery filter has been provided which accomplishes at least all of its stated objectives.

Obviously many modifications and variations of the present invention are possible in light of the above teachings. It is therefore to be understood that, within the scope of the appended claims, the invention may be practiced otherwise than as specifically described.

I claim:
1. A chemical recovery filter, comprising:
a canister;
a steel wire filter element having a central core, said steel wire filter element being disposed within said canister; being vertically spaced from the bottom of said canister by a vertical spacer including an upper contact surface disposed in supporting relationship to said filter element; and an integrally formed vertically extended central plug having a reduced cross-sectional area, said plug being disposed in mating relationship within the lower portion of said central core; and being horizontally spaced from the sidewalls of said canister by a bottom open grid horizontal spacer attached to the bottom of said filter element and by a top open grid horizontal spacer attached to the top of said filter element, said horizontal spacers extending horizontally to the sidewalls of said canister;
a snap-connect inlet fitting secured to said canister and communicating between the exterior of said canister and the interior of said canister in the space between the sidewalls and said filter element;
a snap-connect outlet fitting secured to said canister and communicating between the exterior of said canister and the interior of said canister within the central core of said filter element;
said snap-connect fittings including a male snap connector stem attached to said canister, said male stem having an annular groove in the portion extending exterior of said canister; a female snap connector element including retainer tabs moveable between a first position wherein said tabs are disposed in mating relationship with said annular groove and a second position wherein said tabs are retracted and separated a distance greater than the diameter of said male stem, and a neoprene o-ring disposed above said retainer tabs in sealing relationship with the upper portion of said male stem and the inside wall of the female connector; and a stainless steel spring contacting said tabs and biasing said tabs to said first position, whereby the female connector is rotatably attached to said male connector when said retainer tabs are in said first position; and
a by-pass tube connected to and communicating between said inlet fitting and said outlet fitting, said tube being disposed exterior of said canister and including an opening in the uppermost portion thereof.

2. A chemical recovery filter consisting of:
a canister;
a steel wire filter element having a central core, said filter element being disposed within said canister;
a vertical spacer including an upper support surface disposed in supporting relationship to said filter element, and an integrally formed vertically extended central plug having a reduced cross-sectional area, said plug being disposed in mating relationship with the central core of said filter element;
a bottom open grid horizontal spacer attached to the bottom of said filter element and extending horizontally to the sidewalls of said canister;

a top open grid horizontal spacer attached to the top of said filter element and extending horizontally to the sidewalls of said canister;

a snap-connect inlet fitting secured to said canister and communicating between the exterior of said canister and the interior of said canister in the space between the sidewalls and said filter element;

a snap-connect outlet fitting secured to said canister and communicating between the exterior of said canister and the interior of said canister within the central core of said filter element; and a by-pass tube connected to and communicating between said inlet fitting and said outlet fitting, said tube being disposed exterior of said canister and including an opening in the uppermost portion thereof.

* * * * *